United States Patent
Peng et al.

(10) Patent No.: US 11,371,822 B2
(45) Date of Patent: Jun. 28, 2022

(54) ALTERNATING ELECTRIC FIELD BASED PLANE 2D TIME-GRATING DISPLACEMENT SENSOR

(71) Applicant: Genertec Guoce Time Grating Technology Co., Ltd, Chongqing (CN)

(72) Inventors: Kai Peng, Chongqing (CN); Xiaokang Liu, Chongqing (CN); Hongji Pu, Chongqing (CN); Zhicheng Yu, Chongqing (CN); Hewen Wang, Chongqing (CN)

(73) Assignee: Genertec Guoce Time Grating Technology Co., Ltd, Chongqing (CN)

( * ) Notice: Subject to any disclaimer, the term of this patent is extended or adjusted under 35 U.S.C. 154(b) by 0 days.

(21) Appl. No.: 17/289,748

(22) PCT Filed: Sep. 12, 2019

(86) PCT No.: PCT/CN2019/105618
§ 371 (c)(1),
(2) Date: Apr. 29, 2021

(87) PCT Pub. No.: WO2020/140476
PCT Pub. Date: Jul. 9, 2020

(65) Prior Publication Data
US 2021/0404788 A1    Dec. 30, 2021

(30) Foreign Application Priority Data
Jan. 4, 2019 (CN) .......................... 201910008990.6

(51) Int. Cl.
*G01B 7/00* (2006.01)
*G01B 7/02* (2006.01)

(52) U.S. Cl.
CPC .............. *G01B 7/023* (2013.01); *G01B 7/003* (2013.01)

(58) Field of Classification Search
CPC .. G01D 5/2415; G01D 2205/90; G01B 7/003; G01B 7/023
See application file for complete search history.

(56) References Cited

U.S. PATENT DOCUMENTS

| 4,633,249 A | 12/1986 | Sasaki |
| 4,878,013 A * | 10/1989 | Andermo ............... G01B 7/003 340/870.37 |
| 2017/0003145 A1 * | 1/2017 | Liu et al. ............... G01D 5/241 |

FOREIGN PATENT DOCUMENTS

| CN | 103822571 | 5/2014 |
| CN | 104697424 | 6/2015 |

(Continued)

OTHER PUBLICATIONS

Kai Peng et al., "Sensing Mechanism and Error Analysis of a Capacitive Long-range Displacement Nanometer Sensor Based on Time Grating", IEEE Sensors Journal, Mar. 2017, pp. 1-12.

(Continued)

*Primary Examiner* — Jermele M Hollington
*Assistant Examiner* — Suresh K Rajaputra
(74) *Attorney, Agent, or Firm* — JCIPRNET (57) ABSTRACT

Disclosed is an alternating electric field based plane 2D time-grating displacement sensor which includes two parts: the base of fixed ruler and the base of moving ruler, and the two parts are installed in parallel. The base of fixed ruler is arranged with square excitation electrodes that are respectively staggered coded along axis X and Y, and the base of moving ruler is arranged with induction electrodes arranged adjacently along X-axis and Y-axis, and the four induction groups respectively output four traveling wave signals through electric field coupling, and summation of adjacent output signals with an adder can simultaneously decouple two traveling wave signals with opposite phases and only containing X-axis displacement and two traveling wave (Continued)

signals with opposite phases and only containing Y-axis displacement; two traveling wave signals in either direction are differenced by a subtractor to eliminate common mode interference.

8 Claims, 7 Drawing Sheets

(56) References Cited

FOREIGN PATENT DOCUMENTS

| | | |
|---|---|---|
| CN | 106257231 | 12/2016 |
| CN | 208206026 | 12/2018 |
| CN | 109631735 | 4/2019 |

OTHER PUBLICATIONS

Wu Liang et al., "Linear time grating displacement sensor based on linear array of planar coils", Chinese Journal of Scientific Instrument, submit with English abstract, Jan. 2017, pp. 83-90.

"International Search Report (Form PCT/ISA/210) of PCT/CN2019/105618," dated Sep. 29, 2019, with English translation thereof, pp. 1-6.

* cited by examiner

ALTERNATING ELECTRIC FIELD BASED PLANE 2D TIME-GRATING DISPLACEMENT SENSOR

CROSS-REFERENCE TO RELATED APPLICATION

This application is a 371 of international application of PCT application serial no. PCT/CN2019/105618, filed on Sep. 12, 2019, which claims the priority benefit of China application no. 201910008990.6, filed on Jan. 4, 2019. The entirety of each of the above mentioned patent applications is hereby incorporated by reference herein and made a part of this specification.

BACKGROUND OF THE INVENTION

1. Technical Field

The disclosure relates to the technical field of precision linear displacement sensors, in particular to an alternating electric field based plane 2D time-grating displacement sensor.

2. Description of Related Art

Precision measurement instruments and processing equipment with multi-dimensional motion often require displacement sensors to ensure high-precision and large-range displacement measurement in each dimension. Traditional two-dimensional displacement measurement is realized by combining two displacement sensors of single degree of freedom, the measurement system and mechanical structure are complicated, and it is easy to introduce Abbe error and multi-axis cumulative error, which is difficult to meet the needs of precision displacement measurement. The existing two-dimensional planar displacement sensors mainly include two-dimensional optical gratings, two-dimensional magnetic gratings and two-dimensional capacitive gratings, wherein manufacturing process and optical path structure of the two-dimensional optical gratings are complex, the cost is too high, and they are easily affected by environmental interference; since the two-dimensional magnetic gratings and two-dimensional capacitive gratings acquire signals by field coupling, the measurement signals in two directions interfere with each other, resulting in low measurement accuracy.

In recent years, a time-grating sensor using clock pulse as a displacement measurement reference has been developed in China, and based on this, a single-row multi-layer structure based electric field-type time-grating linear displacement sensor has been developed (Publication NO. CN103822571A), this sensor uses a high-frequency clock pulse as a measurement reference, and uses an alternating electric field constructed by a plate capacitor to directly couple electric traveling wave signals required for measurement, so it can achieve high-precision displacement measurement over a large range. However, the current electric field-type time grating displacement sensor can only perform one-dimensional linear displacement measurement, and cannot realize plane 2D linear displacement measurement.

BRIEF SUMMARY OF THE INVENTION

The object of the disclosure is to provide an alternating electric field based plane 2D time-grating displacement sensor so as to realize high precision plane 2D linear displacement measurement over a large range, which has a simple structure and decouples completely and has strong anti-interference ability.

The alternating electric field based plane 2D time-grating displacement sensor of the disclosure includes the base of fixed ruler and the base of moving ruler, a lower surface of the base of moving ruler and an upper surface of the base of fixed ruler are installed in parallel and facing to each other with a gap therebetween.

The upper surface of the base of fixed ruler is provided with 2m rows of excitation electrodes, and each row of excitation electrodes is composed of n identical square excitation electrodes evenly arranged along X-axis, the distance $I_e$ spaced between two adjacent square excitation electrodes is greater than the width $L_e$ of one square excitation electrode, and the distance spaced between the two adjacent rows of excitation electrodes along Y-axis is equal to $$\frac{I_e - L_e}{2},$$

starting positions of the two adjacent rows of excitation electrodes along X-axis are offset by $$\frac{I_e + L_e}{2}$$

from each other (i.e., starting positions of the excitation electrodes in odd rows along X-axis are offset from starting positions of the excitation electrodes in even rows along X-axis by $$\frac{I_e + L_e}{2}),$$

starting positions of the excitation electrodes in odd rows along X-axis are the same, and starting positions of the excitation electrodes in even rows along X-axis are the same; where $n=4k_1$, $m=4k_2$, $k_1$ and $k_2$ are both positive integers.

A plurality of square excitation electrodes are connected, XA, XB, XC, XD excitation groups are formed along X-axis, YA, YB, YC, YD excitation groups are formed along Y-axis, XA excitation group is connected to YA excitation group to form an excitation phase A, XB excitation group is connected to YB excitation group to form an excitation phase B, XC excitation group is connected to YC excitation group to form an excitation phase C, XD excitation group is connected to YD excitation group to form an excitation phase D.

The lower surface of the base of moving ruler is provided with r identical induction units, the distance spaced between two adjacent induction units is $I_i$, each induction unit is composed of 4 independent and identical induction electrodes a, b, c and d arranged in a 2×2 matrix, the induction electrodes a and c are located in the same row, the induction electrodes a and b are located in the same column, the length and width of each induction electrode are both $L_i$, the distance between two adjacent induction electrodes is $I_i$, $L_i+=2$ ($L_e+I_e$), then any two adjacent induction electrodes along X-axis or Y-axis in each induction unit have a spatial difference of 180° in this direction, a differential structure is formed, the shape of the induction electrode is a centrosymmetric figure; the induction electrodes a in r induction units are connected to form an induction group a, the induction electrodes b in r induction units are connected to form an induction group b, the induction electrodes c in r induction units are connected to form an induction group c, and the induction electrodes d in r induction units are connected to form an induction group d.

A coupling capacitor is formed between the induction unit and the square excitation electrode facing to the induction unit. When measuring, four sinusoidal excitation signals with the same frequency and same amplitude with a phase difference of 90° one by one are respectively applied on the excitation phases A, B, C and D, when the base of moving ruler performs the plane displacement relative to the base of fixed ruler, the induction groups a, b, c, and d respectively generate four electrical signals $U_a$, $U_b$, $U_c$ and $U_d$ through electric field coupling, each electric signal is composed of two traveling wave signals containing only X-axis and Y-axis displacement, because any two adjacent induction electrodes along X-axis or Y-axis in each induction unit have a spatial difference of 180° in this direction, so the amplitude and frequency of the two traveling wave signals are the same, but the phases are opposite; $U_a$ and $U_b$, $U_c$ and $U_d$ are respectively summed by adder to obtain two traveling wave signals $U_{X+}$ and $U_{X-}$ with opposite phases and only containing X-axis displacement; $U_a$ and $U_c$, $U_b$ and $U_d$ are respectively summed by adder to obtain two traveling wave signals $U_{Y+}$ and $U_{Y-}$ with opposite phases and only containing Y-axis displacement; $U_{X+}$ and $U_{X-}$ are differenced by a subtractor to obtain the X-axis sinusoidal traveling wave signal $U_X$; $U_{Y+}$ and $U_{Y-}$ are differenced by a subtractor to obtain the Y-axis sinusoidal traveling wave signal $U_Y$; the X-axis sinusoidal traveling wave signal $U_X$ is processed to obtain the linear displacement along X-axis of the base of moving ruler relative to the base of fixed ruler (that is, the X-axis sinusoidal traveling wave signal $U_X$ and the reference signal with same frequency are subjected to phase discrimination processing, and the phase difference is represented by the number of interpolated high-frequency clock pulses, after conversion, the linear displacement along X-axis of the base of moving ruler relative to the base of fixed ruler is obtained), the Y-axis sinusoidal traveling wave signal $U_Y$ is processed to obtain the linear displacement along Y-axis of the base of moving ruler relative to the base of fixed ruler (that is, the Y-axis sinusoidal traveling wave signal $U_Y$ and the reference signal with same frequency are subjected to phase discrimination processing, and the phase difference is represented by the number of interpolated high-frequency clock pulses, after conversion, the linear displacement along Y-axis of the base of moving ruler relative to the base of fixed ruler is obtained).

The excitation groups XA, XB, XC and XD are formed as follows: m square excitation electrodes on the even columns along X-axis are connected to form n X excitation units, and the $(4j_1+1)$th X excitation units are connected into a group to form an excitation group XA, the $(4j_1+2)$th X excitation units are connected into a group to form an excitation group XB, the $(4j_1+3)$th X excitation units are connected into a group to form an excitation group XC, and the $(4j_1+4)$th X excitation units are connected into a group to form an excitation group XD, $j_1$ takes all integers from 0 to $(k_1-1)$ in turn.

The excitation groups YA, YB, YC and YD are formed as follows: n square excitation electrodes on the even rows along Y-axis are connected to form m Y excitation units, and the $(4j_2+1)$th Y excitation units are connected into a group to form an excitation group YA, the $(4j_2+2)$th Y excitation units are connected into a group to form an excitation group YB, the $(4j_2+3)$th Y excitation units are connected into a group to form an excitation group YC, and the $(4j_2+4)$th Y excitation units are connected into a group to form an excitation group YD, $j_2$ takes all integers from 0 to $(k_2-1)$ in turn.

The shape of the induction electrodes a, b, c and d are preferably square, circle, or diamond.

The disclosure adopts staggered arrangement of the square excitation electrodes to realize simultaneous encoding along X-axis or Y-axis on the same plane, in the same induction unit, two adjacent induction electrodes are arranged in a differential structure to pick up the signal, the adder is used to sum the output signals of the two adjacent induction groups to filter out the coupling signal in the non-measurement direction, and the subtractor is used to difference the differential signal to eliminate the common mode interference, thereby further improving the signal decoupling ability and the decoupling is complete, the anti-interference ability is strong, so as to realize high precision plane 2D displacement measurement over a large range, and the structure is simple.

DETAILED DESCRIPTION OF THE INVENTION

The disclosure will be described in detail below with reference to the drawings.

Embodiment 1: an alternating electric field based plane 2D time-grating displacement sensor as shown in FIG. 1 to FIG. 4 includes the base of fixed ruler 1 and the base of moving ruler 2, a lower surface of the base of moving ruler 2 and an upper surface of the base of fixed ruler 1 are installed in parallel and facing to each other with a gap of d=1 mm therebetween.

Figure 1:
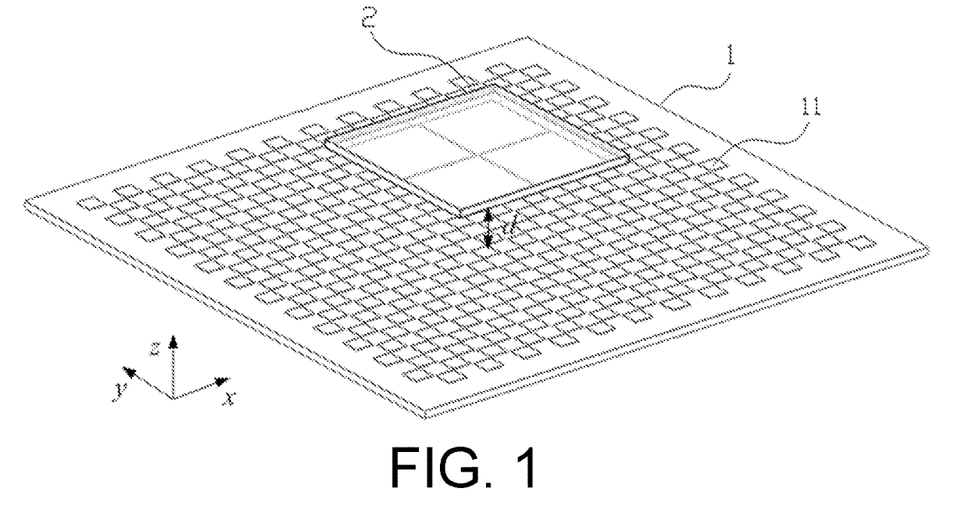
FIG. 1 is a schematic diagram of corresponding relationship between the base of fixed ruler and the base of moving ruler in Embodiment 1.
Figure 2:
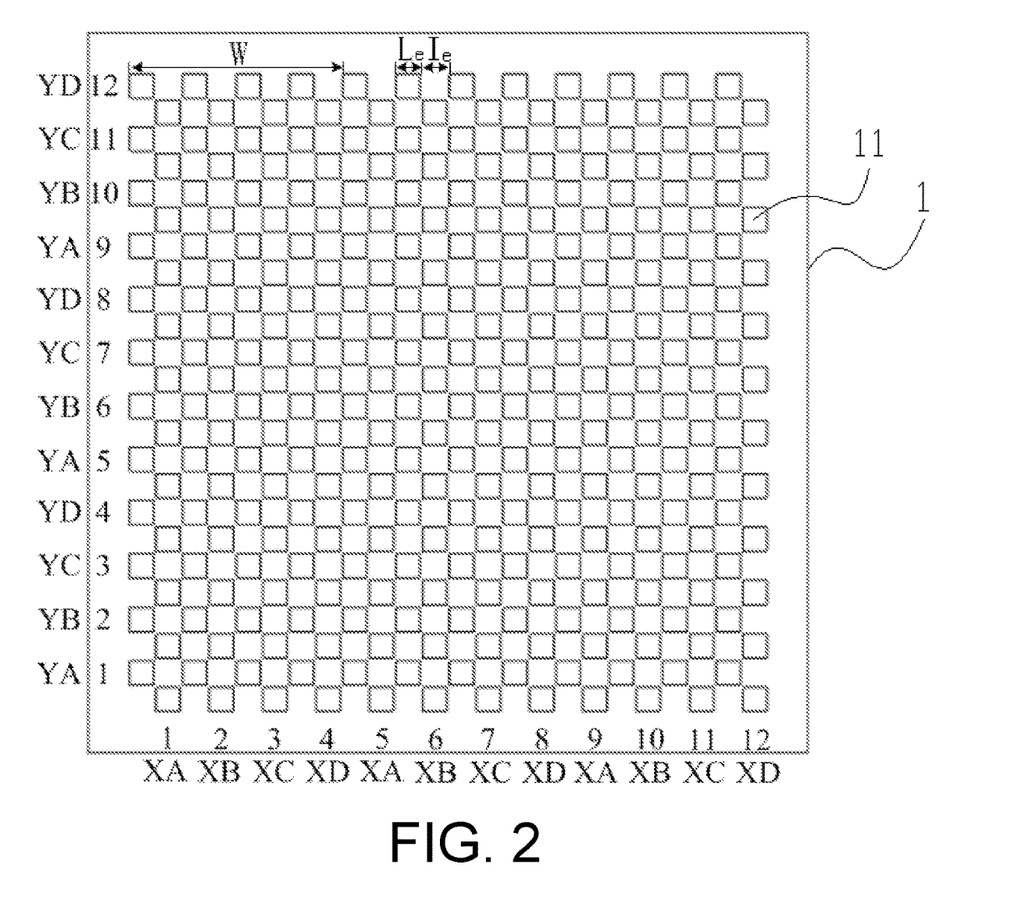
FIG. 2 is a schematic diagram of the structure of the base of fixed ruler in Embodiment 1.

As shown in FIG. 2, there are 24 rows (i.e. m=12) of excitation electrodes arranged on the upper surface of the base of fixed ruler 1, and each row of excitation electrodes consists of 12 (i.e. n=12) identical square excitation electrodes 11 evenly arranged along X-axis, the distance $I_e$ spaced between two adjacent square excitation electrodes 11 is equal to 6 mm, the width $L_e$ of one square excitation electrode 11 is equal to 4 mm, and the distance spaced between two adjacent rows of excitation electrodes along Y-axis is equal to 1 mm, starting positions of the excitation electrodes in odd rows (i.e., excitation electrodes in row 1, row 3, . . . , row 21, and row 23) along X-axis are the same, while starting positions of the excitation electrodes in even rows (i.e., excitation electrodes in row 2, row 4, . . . row 22, and row 24) along X-axis are the same, and starting positions of the excitation electrodes in odd rows along X-axis are offset from starting positions of the excitation electrodes in even rows along X-axis by 5 mm. 12 square excitation electrodes 11 on each even column along X-axis are connected by excitation signal leads, forming a total of 12 X excitation units, which are numbered 1, 2, 3, . . . , 12 in the positive direction of X-axis, the 1st, 5th and 9th X excitation units are connected into a group by excitation signal leads to form an XA excitation group, the 2nd, 6th and 10th X excitation units are connected into a group by excitation signal leads to form an XB excitation group, the 3rd, 7th, and 11th X excitation units are connected into a group by excitation signal leads to form an XC excitation group, and the 4th, 8th, and 12th X excitation units are connected into a group by excitation signal leads to form an XD excitation group; 12 square excitation electrodes 11 on each even row along Y-axis are connected by excitation signal leads, forming a total of 12 Y excitation units, which are numbered 1, 2, 3, . . . , 12 in the positive direction of axis Y, the 1st, 5th and 9th Y excitation units are connected into a group by excitation signal leads to form a YA excitation group, the 2nd, 6th and 10th Y excitation units are connected into a group by excitation signal leads to form a YB excitation group, the 3rd, 7th, and 11th Y excitation units are connected into a group by excitation signal leads to form a YC excitation group, and the 4th, 8th and 12th Y excitation units are connected into a group by excitation signal leads to form a YD excitation group. XA excitation group and YA excitation group are connected by excitation signal leads to form an excitation phase A, XB excitation group and YB excitation group are connected by excitation signal leads to form an excitation phase B, XC excitation group and YC excitation group are connected by excitation signal leads to form an excitation phase C, and XD excitation group and YD excitation group are connected by excitation signal leads to form an excitation phase D. Every four-square excitation electrodes 11 along X-axis or Y-axis constitute one counter electrode, and the width W of the counter electrode is equal to $4(L_e+I_e)=40$ mm, therefore, there are 3 counter electrodes along X-axis and also 3 counter electrodes along Y-axis.

Figure 3:
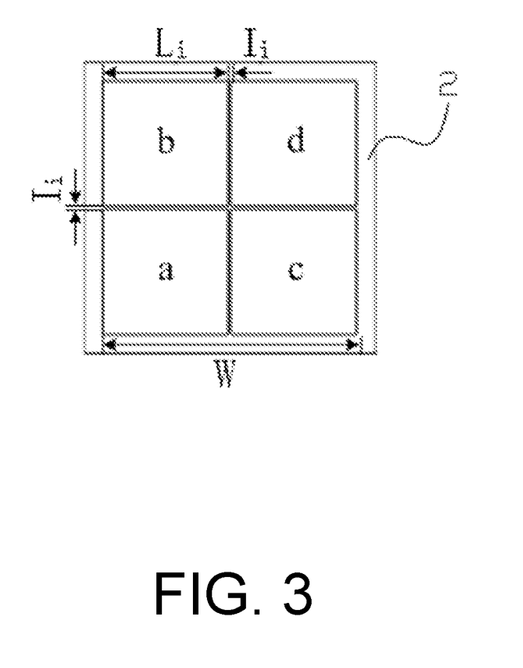
FIG. 3 is a schematic diagram of the structure of the base of moving ruler in Embodiment 1.

As shown in FIG. 3, the lower surface of the base of moving ruler 2 is provided with 1 induction unit, which is composed of 4 independent and identical induction electrodes a, b, c, and d arranged in a 2×2 matrix, the induction electrodes a and c are in the same row, the induction electrodes a and b are in the same column, the shape of the induction electrodes a, b, c, and d are square, and the length and width $L_i$ of the induction electrodes a, b, c, and d are all equal to 19 mm, the distance $I_i$ spaced between two adjacent induction electrodes along X-axis is equal to 1 mm, and the distance $I_i$ spaced between two adjacent induction electrodes along Y-axis is equal to 1 mm, one induction electrode a constitutes an induction group a, one induction electrode b constitutes an induction group b, one induction electrode c constitutes an induction group c, and one induction electrode d constitutes an induction group d.

A coupling capacitor is formed between the induction unit on the lower surface of the base of moving ruler 2 and the square excitation electrode 11 on the upper surface of the base of moving ruler 1 facing to the induction unit. When measuring, sinusoidal excitation signals $U_A=U_m \sin \omega t$, $U_B=U_m \cos \omega t$, $U_C=-U_m \sin \omega t$ and $U_D=-U_m \cos \omega t$ are respectively applied on the excitation phases A, B, C and D, where the amplitude $U_m$ of the excitation signal is equal to 5V, frequency f is equal to 40 KHz, angular frequency $\omega=2\pi f=8\times10^4\pi$. When the base of moving ruler 2 performs the plane displacement relative to the base of fixed ruler 1, the induction groups a, b, c, and d respectively generate four electrical signals $U_a$, $U_b$, $U_c$ and $U_d$ through electric field coupling, and the expression is:

$$\begin{cases} U_a = KeU_m\left[\sin\left(\omega t + \frac{2\pi x}{W}\right) + \sin\left(\omega t + \frac{2\pi y}{W}\right)\right] \\ U_b = KeU_m\left[\sin\left(\omega t + \frac{2\pi x}{W}\right) - \sin\left(\omega t + \frac{2\pi y}{W}\right)\right] \\ U_c = KeU_m\left[-\sin\left(\omega t + \frac{2\pi x}{W}\right) + \sin\left(\omega t + \frac{2\pi y}{W}\right)\right] \\ U_d = KeU_m\left[-\sin\left(\omega t + \frac{2\pi x}{W}\right) - \sin\left(\omega t + \frac{2\pi y}{W}\right)\right] \end{cases}$$

where Ke is the electric field coupling coefficient, and x and y are linear displacements of the base of moving ruler 2 relative to the base of fixed ruler 1 along X-axis and Y-axis, respectively.

Figure 4:
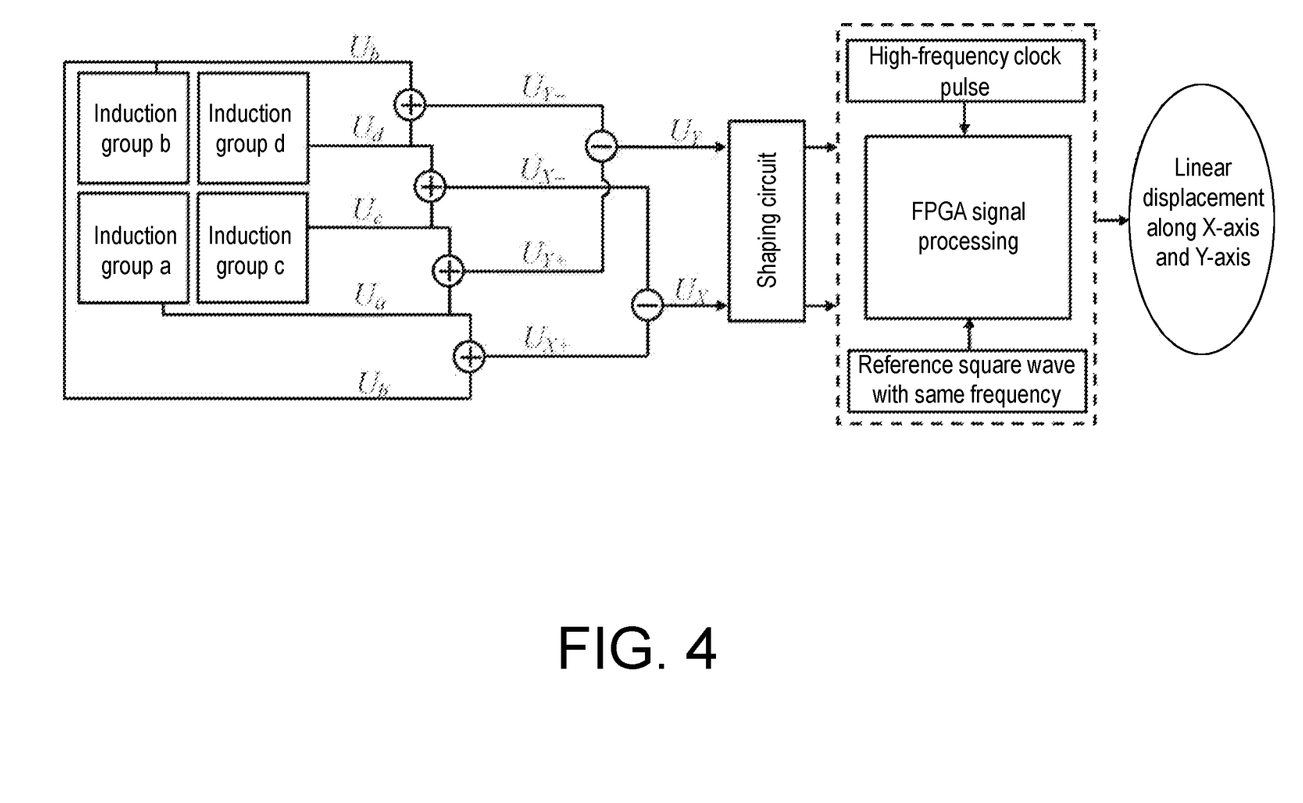
FIG. 4 is a schematic diagram of signal processing in Embodiment 1.

The signal processing method is shown in FIG. 4, $U_a$ and $U_b$ are summed by an adder, $U_c$ and $U_d$ are summed by an adder, and two traveling wave signals $U_{X+}$ and $U_{X-}$ with opposite phases and only containing X-axis displacement are obtained, $U_a$ and $U_c$ are summed by an adder, $U_b$ and $U_d$ are summed by an adder, and two traveling wave signals $U_{Y+}$ and $U_{Y-}$ with opposite phases and only containing Y-axis displacement are obtained, and the expression is:

$$\begin{cases} U_{X+} = U_a + U_b = 2KeU_m\sin\left(\omega t + \frac{2\pi x}{W}\right) \\ U_{X-} = U_c + U_d = -2KeU_m\sin\left(\omega t + \frac{2\pi x}{W}\right) \\ U_{Y+} = U_a + U_c = 2KeU_m\sin\left(\omega t + \frac{2\pi y}{W}\right) \\ U_{Y-} = U_b + U_d = -2KeU_m\sin\left(\omega t + \frac{2\pi y}{W}\right) \end{cases}$$

$U_{X+}$ and $U_{X-}$ are differenced by a subtractor, $U_{Y+}$ and $U_{Y-}$ are differenced by a subtractor, and X-axis sinusoidal traveling wave signal $U_X$ and Y-axis sinusoidal traveling wave signal $U_Y$ are finally obtained, and the expression is:

$$\begin{cases} U_X = U_{X+} - U_{X-} = 4KeU_m\sin\left(\omega t + \frac{2\pi x}{W}\right) \\ U_Y = U_{Y+} - U_{Y-} = 4KeU_m\sin\left(\omega t + \frac{2\pi y}{W}\right) \end{cases}$$

The X-axis sinusoidal traveling wave signal $U_X$ and Y-axis sinusoidal traveling wave signal $U_Y$ are shaped into a square wave by a shaping circuit, and then simultaneously sent to the FPGA for phase discrimination processing, and compared with one reference square wave with same frequency in terms of phase, and the phase difference is represented by the number of interpolated high-frequency clock pulses, after conversion, the linear displacement x along X-axis and the linear displacement y along Y-axis of the base of moving ruler 2 relative to the base of fixed ruler 1 are obtained.

Figure 5:
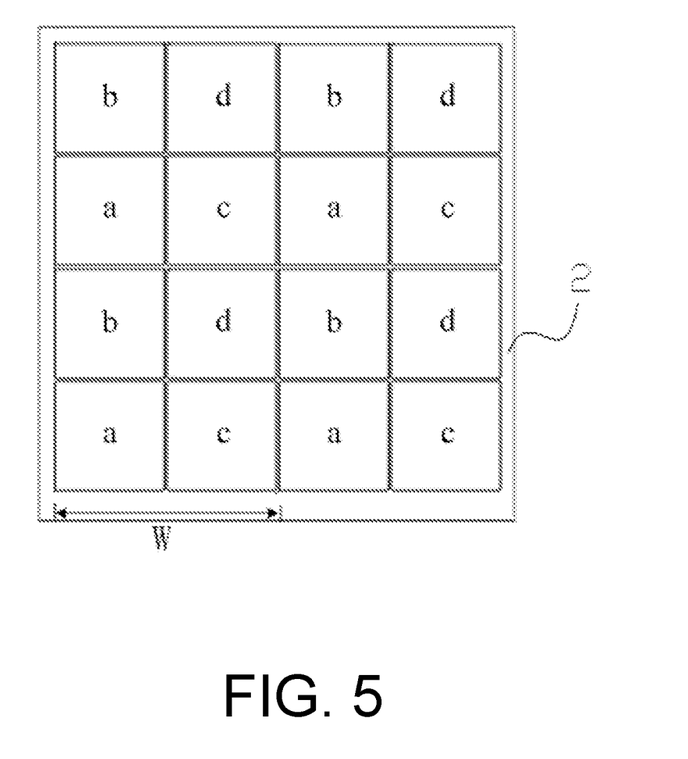
FIG. 5 is a schematic diagram of the structure of the base of moving ruler in Embodiment 2.

Embodiment 2: the alternating electric field based plane 2D time-grating displacement sensor of this embodiment has the same measurement principle and most of the structure as Embodiment 1, except that: as shown in FIG. 5, the lower surface of the base of moving ruler 2 is provided with 4 identical induction units, the signal strength is better, the 4 induction units are arranged in a 2×2 matrix, the distance spaced between two adjacent induction units along X-axis is 1 mm, and the distance spaced between the two adjacent induction units along Y-axis is 1 mm, the induction electrodes a of the 4 induction units are connected by induction signal leads (that is, the 4 induction electrodes a are connected by induction signal leads) to form an induction group a, the induction electrodes b of the 4 induction units are connected by induction signal leads (that is, the 4 induction electrodes b are connected by induction signal leads) to form an induction group b, the induction electrodes c in the 4 induction unit are connected by induction signal leads (that is, the 4 induction electrodes c are connected by induction signal leads) to form an induction group c, and induction electrodes d in the 4 induction units are connected by induction signal leads (that is, 4 induction electrodes d are connected by induction signal leads) to form an induction group d.

Figure 6:
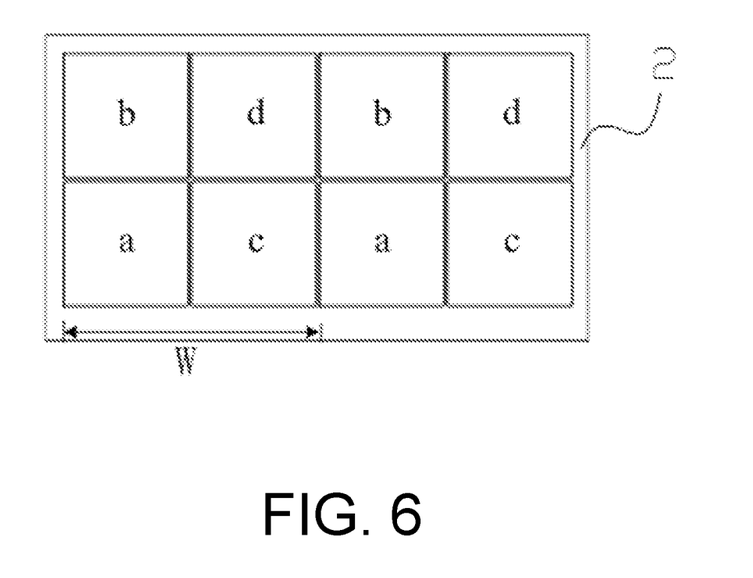
FIG. 6 is a schematic diagram of the structure of the base of moving ruler in Embodiment 3.

Embodiment 3: the alternating electric field based plane 2D time-grating displacement sensor of this embodiment has the same measurement principle and most of the structure as Embodiment 1, except that: as shown in FIG. 6, the lower surface of the base of moving ruler 2 is provided with 2 identical induction units, the signal strength is better, the distance spaced between 2 induction units arranged along X-axis is 1 mm, the induction electrodes a of the 2 induction units are connected by induction signal leads (that is, the 2 induction electrodes a are connected by induction signal leads) to form an induction group a, the induction electrodes b of the 2 induction units are connected by induction signal leads (that is, the 2 induction electrodes b are connected by induction signal leads) to form an induction group b, the induction electrodes c in the 2 induction unit are connected by induction signal leads (that is, the 2 induction electrodes c are connected by induction signal leads) to form an induction group c, and induction electrodes d in the 2 induction units are connected by induction signal leads (that is, 2 induction electrodes d are connected by induction signal leads) to form an induction group d.

Figure 7:
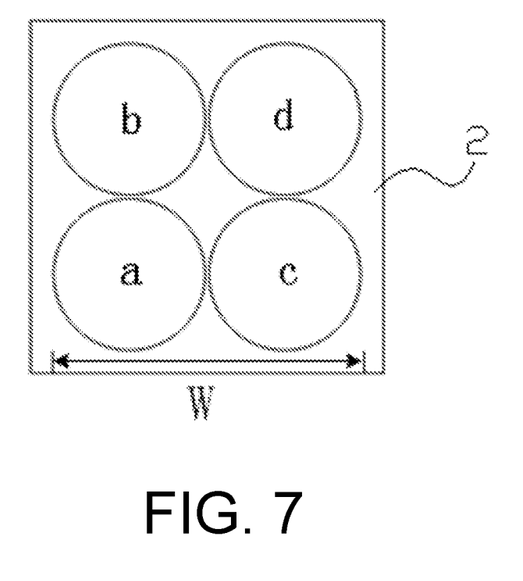
FIG. 7 is a schematic diagram of the structure of the base of moving ruler in Embodiment 4.

Embodiment 4: the alternating electric field based plane 2D time-grating displacement sensor of this embodiment has the same measurement principle and most of the structure as Embodiment 1, except that: as shown in FIG. 7, the shape of the induction electrodes a, b, c and d are circle.

Figure 8:
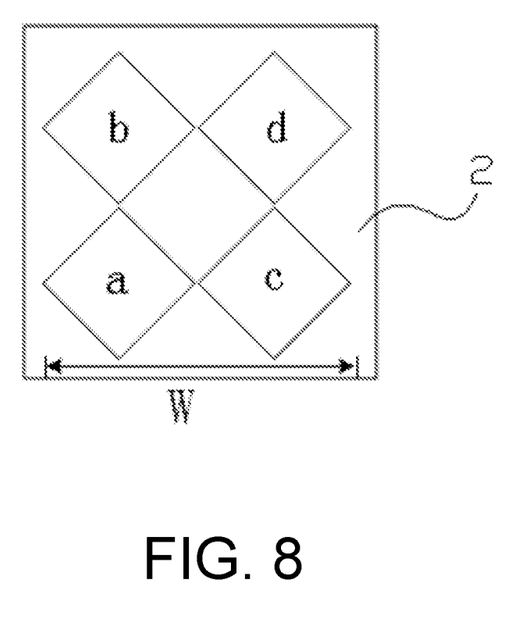
FIG. 8 is a schematic diagram of the structure of the base of moving ruler in Embodiment 5.

Embodiment 5: the alternating electric field based plane 2D time-grating displacement sensor of this embodiment has the same measurement principle and most of the structure as Embodiment 1, except that: as shown in FIG. 8, the shape of the induction electrodes a, b, c and d are diamond.

Figure 9:
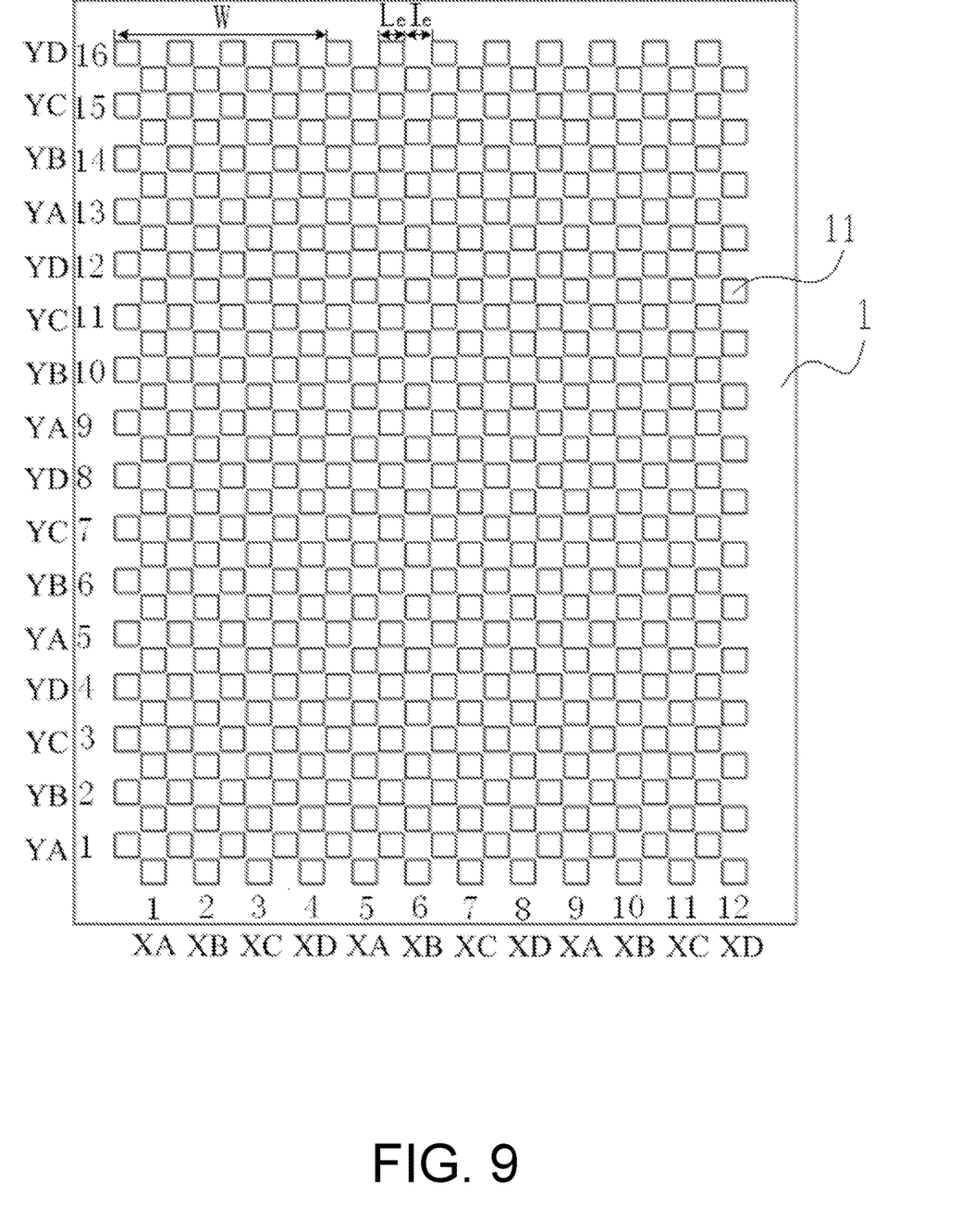
FIG. 9 is a schematic diagram of the structure of the base of fixed ruler in Embodiment 6.

Embodiment 6: the alternating electric field based plane 2D time-grating displacement sensor of this embodiment has the same measurement principle and most of the structure as Embodiment 1, except that: as shown in FIG. 9, there are 32 rows (i.e. m=16) of excitation electrodes arranged on the upper surface of the base of fixed ruler 1, and each row of excitation electrodes consists of 12 (i.e. n=12) identical square excitation electrodes 11 evenly arranged along X-axis, the distance $I_e$ spaced between two adjacent square excitation electrodes 11 is equal to 6 mm, the width $L_e$ of one square excitation electrode 11 is equal to 4 mm, and the distance spaced between two adjacent rows of excitation electrodes along Y-axis is equal to 1 mm, starting positions of the excitation electrodes in odd rows (i.e., excitation electrodes in row 1, row 3, ..., row 29, and row 31) along X-axis are the same, while starting positions of the excitation electrodes in even rows (i.e., excitation electrodes in row 2, row 4, ... row 30, and row 32) along X-axis are the same, and starting positions of the excitation electrodes in odd rows along X-axis are offset from starting positions of the excitation electrodes in even rows along X-axis by 5 mm. 16 square excitation electrodes 11 on each even column along X-axis are connected by excitation signal leads, forming a total of 12 X excitation units, which are numbered 1, 2, 3, ..., 12 in the positive direction of X-axis, the 1st, 5th and 9th X excitation units are connected into a group by excitation signal leads to form an XA excitation group, the 2nd, 6th and 10th X excitation units are connected into a group by excitation signal leads to form an XB excitation group, the 3rd, 7th, and 11th X excitation units are connected into a group by excitation signal leads to form an XC excitation group, and the 4th, 8th, and 12th X excitation units are connected into a group by excitation signal leads to form an XD excitation group; 12 square excitation electrodes 11 on each even row along Y-axis are connected by excitation signal leads, forming a total of 16 Y excitation units, which are numbered 1, 2, 3, ..., 16 in the positive direction of Y-axis, the 1st, 5th, 9th and 13th Y excitation units are connected into a group by excitation signal leads to form a YA excitation group, the 2nd, 6th, 10th and 14th Y excitation units are connected into a group by excitation signal leads to form a YB excitation group, the 3rd, 7th, 11th and 15th Y excitation units are connected into a group by excitation signal leads to form a YC excitation group, and the 4th, 8th, 12th and 16th Y excitation units are connected into a group by excitation signal leads to form a YD excitation group. Every four-square excitation electrodes 11 along X-axis or Y-axis constitute one counter electrode, and the width W of the counter electrode is equal to $4(L_e+I_e)=40$ mm, therefore, there are 3 counter electrodes along X-axis and 4 counter electrodes along Y-axis.

Figure 10:
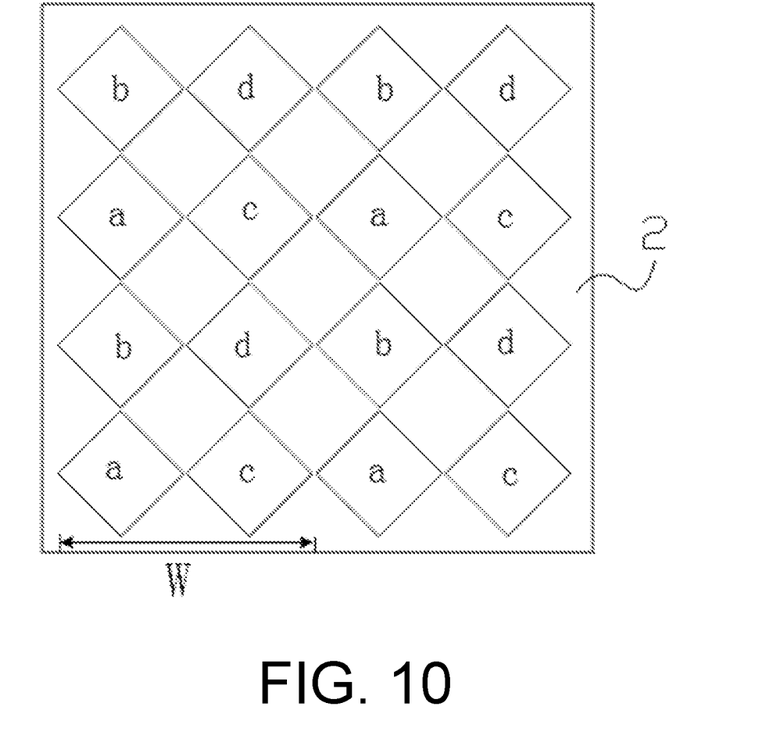
FIG. 10 is a schematic diagram of the structure of the base of moving ruler in Embodiment 7.

Embodiment 7: the alternating electric field based plane 2D time-grating displacement sensor of this embodiment has the same measurement principle and most of the structure as Embodiment 1, except that: as shown in FIG. 10, the lower surface of the base of moving ruler 2 is provided with 4 identical induction units, the signal strength is better, the 4 induction units are arranged in a 2×2 matrix, the distance spaced between two adjacent induction units along X-axis is 1 mm, and the distance spaced between the two adjacent induction units along Y-axis is 1 mm, the shape of the induction electrodes a, b, c, and d in each induction unit is a diamond, the induction electrodes a of the 4 induction units are connected by induction signal leads (that is, the 4 induction electrodes a are connected by induction signal leads) to form an induction group a, the induction electrodes b of the 4 induction units are connected by induction signal leads (that is, the 4 induction electrodes b are connected by induction signal leads) to form an induction group b, the induction electrodes c in the 4 induction unit are connected by induction signal leads (that is, the 4 induction electrodes c are connected by induction signal leads) to form an induction group c, and induction electrodes d in the 4 induction units are connected by induction signal leads (that is, 4 induction electrodes d are connected by induction signal leads) to form an induction group d.

Figure 11:
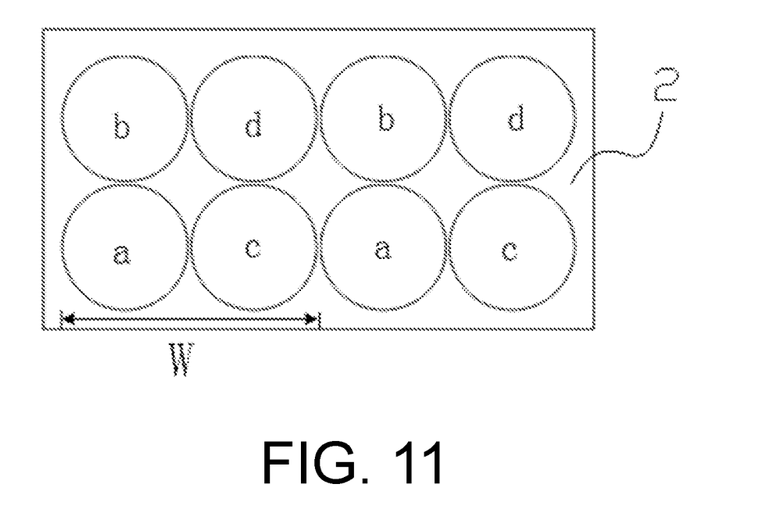
FIG. 11 is a schematic diagram of the structure of the base of moving ruler in Embodiment 8.

Embodiment 8: the alternating electric field based plane 2D time-grating displacement sensor of this embodiment has the same measurement principle and most of the structure as Embodiment 1, except that: as shown in FIG. 11, the lower surface of the base of moving ruler 2 is provided with 2 identical induction units, the signal strength is better, the distance spaced between 2 induction units arranged along X-axis is 1 mm, the shape of the induction electrode a, b, c, and d in each induction unit is a circle, the induction electrodes a of the 2 induction units are connected by induction signal leads (that is, the 2 induction electrodes a are connected by induction signal leads) to form an induction group a, the induction electrodes b of the 2 induction units are connected by induction signal leads (that is, the 2 induction electrodes b are connected by induction signal leads) to form an induction group b, the induction electrodes c in the 2 induction unit are connected by induction signal leads (that is, the 2 induction electrodes c are connected by induction signal leads) to form an induction group c, and induction electrodes d in the 2 induction units are connected by induction signal leads (that is, 2 induction electrodes d are connected by induction signal leads) to form an induction group d.

What is claimed is:

1. An alternating electric field based plane 2D time-grating displacement sensor, comprising a base of a fixed ruler and a base of a moving ruler, a lower surface of the base of the moving ruler and an upper surface of the base of the fixed ruler being installed in parallel and facing to each other with a gap therebetween; wherein:

the upper surface of the base of the fixed ruler is provided with 2m rows of excitation electrodes, and each row of the excitation electrodes is composed of n identical square excitation electrodes evenly arranged along X-axis, the distance $I_e$ spaced between two adjacent square excitation electrodes is greater than the width $L_e$ of one square excitation electrode, and the distance spaced between the two adjacent rows of the excitation electrodes along Y-axis is equal to $$\frac{I_e - L_e}{2},$$

starting positions of the two adjacent rows of the excitation electrodes along X-axis are offset by $$\frac{I_e + L_e}{2}$$

from each other, starting positions of the excitation electrodes in odd rows along X-axis are the same, and starting positions of the excitation electrodes in even rows along X-axis are the same; where n=4$k_1$, m=4$k_2$, $k_1$ and $k_2$ are both positive integers;

a plurality of the square excitation electrodes are connected, XA, XB, XC, XD excitation groups are formed along X-axis, YA, YB, YC, YD excitation groups are formed along Y-axis, XA excitation group is connected to YA excitation group to form an excitation phase A, XB excitation group is connected to YB excitation group to form an excitation phase B, XC excitation group is connected to YC excitation group to form an excitation phase C, XD excitation group is connected to YD excitation group to form an excitation phase D;

the lower surface of the base of the moving ruler is provided with r identical induction units, the distance spaced between two adjacent induction units is $I_i$, each induction unit is composed of 4 independent and identical induction electrodes a, b, c and d arranged in a 2×2 matrix, the induction electrodes a and c are located in the same row, the induction electrodes a and b are located in the same column, the length and width of each induction electrode are both $L_i$, the distance between two adjacent induction electrodes is $I_i$, $L_i+I_i$=2 ($L_e+I_e$), a shape of the induction electrode is a centrosymmetric figure; the induction electrodes a in r induction units are connected to form an induction group a, the induction electrodes b in r induction units are connected to form an induction group b, the induction electrodes c in r induction units are connected to form an induction group c, and the induction electrodes d in r induction units are connected to form an induction group d;

when measuring, four sinusoidal excitation signals with the same frequency and same amplitude with a phase difference of 90° one by one are respectively applied on the excitation phases A, B, C and D, when the base of moving ruler performs the plane displacement relative to the base of fixed ruler, the induction groups a, b, c, and d respectively generate four electrical signals $U_a$, $U_b$, $U_c$ and $U_d$; $U_a$ and $U_b$ are summed by an adder to obtain one traveling wave signal $U_{X+}$, $U_c$ and $U_d$ are summed by an adder to obtain one traveling wave signal $U_{X-}$; $U_a$ and $U_c$ are summed by an adder to obtain one traveling wave signal $U_{Y+}$, $U_b$ and $U_d$ are summed by an adder to obtain one traveling wave signal $U_{Y-}$; $U_{X+}$ and $U_{X-}$ are differenced by a subtractor to obtain the X-axis sinusoidal traveling wave signal $U_X$, $U_{Y+}$ and $U_{Y-}$ are differenced by a subtractor to obtain the Y-axis sinusoidal traveling wave signal $U_Y$; the X-axis sinusoidal traveling wave signal $U_X$ is processed to obtain the linear displacement along X-axis of the base of moving ruler relative to the base of fixed ruler; the Y-axis sinusoidal traveling wave signal $U_Y$ is processed to obtain the linear displacement along Y-axis of the base of moving ruler relative to the base of fixed ruler.

2. The alternating electric field based plane 2D time-grating displacement sensor as set forth in claim 1, wherein the excitation groups XA, XB, XC and XD are formed as follows: m square excitation electrodes on the even columns along X-axis are connected to form n X excitation units, and the (4$j_1$+1)th X excitation units are connected into a group to form an excitation group XA, the (4$j_1$+2)th X excitation units are connected into a group to form an excitation group XB, the (4$j_1$+3)th X excitation units are connected into a group to form an excitation group XC, and the (4$j_1$+4)th X excitation units are connected into a group to form an excitation group XD, $j_1$ takes all integers from 0 to ($k_1$−1) in turn;

the excitation groups YA, YB, YC and YD are formed as follows: n square excitation electrodes on the even rows along Y-axis are connected to form m Y excitation units, and the (4$j_2$+1)th Y excitation units are connected into a group to form an excitation group YA, the (4$j_2$+2)th Y excitation units are connected into a group to form an excitation group YB, the (4$j_2$+3)th Y excitation units are connected into a group to form an excitation group YC, and the $(4j_2+4)$th Y excitation units are connected into a group to form an excitation group YD, $j_2$ takes all integers from 0 to $(k_2-1)$ in turn.

3. The alternating electric field based plane 2D time-grating displacement sensor as set forth in claim 1, wherein the shape of the induction electrodes are square.

4. The alternating electric field based plane 2D time-grating displacement sensor as set forth in claim 1, wherein the shape of the induction electrodes are circle.

5. The alternating electric field based plane 2D time-grating displacement sensor as set forth in claim 1, wherein the shape of the induction electrodes are diamond.

6. The alternating electric field based plane 2D time-grating displacement sensor as set forth in claim 2, wherein the shape of the induction electrodes are square.

7. The alternating electric field based plane 2D time-grating displacement sensor as set forth in claim 2, wherein the shape of the induction electrodes are circle.

8. The alternating electric field based plane 2D time-grating displacement sensor as set forth in claim 2, wherein the shape of the induction electrodes are diamond.

\* \* \* \* \*